United States Patent [19]

Gracia

[11] 4,240,767
[45] Dec. 23, 1980

[54] VALVING METHODS AND APPARATUS FOR FLOODING AND GROUTING OFFSHORE JACKET SLEEVES

[75] Inventor: Bert E. Gracia, Houston, Tex.
[73] Assignee: Brown & Root, Inc., Houston, Tex.
[21] Appl. No.: 18,401
[22] Filed: Mar. 7, 1979
[51] Int. Cl.³ .................. E02B 17/02; E02D 21/00; E02D 27/52
[52] U.S. Cl. .................. 405/227; 405/205; 405/225
[58] Field of Search .............. 405/225, 227, 205, 244, 405/232–233; 166/335, 362

[56] References Cited

U.S. PATENT DOCUMENTS

| | | | |
|---|---|---|---|
| 1,572,741 | 2/1926 | Meem | 405/205 X |
| 3,564,856 | 2/1971 | Blount et al. | 405/225 |
| 3,585,801 | 6/1971 | Koehler | 405/205 X |
| 3,633,369 | 1/1972 | Lawrence | 405/205 |
| 3,868,826 | 3/1975 | Landers | 405/211 |
| 3,878,687 | 4/1975 | Tragesser, Jr. | 405/227 X |
| 4,009,581 | 3/1977 | Britton et al. | 405/227 |
| 4,063,427 | 12/1977 | Hoffman | 405/225 |
| 4,140,426 | 2/1979 | Knox | 405/227 X |
| 4,171,923 | 10/1979 | Landers | 405/225 |

OTHER PUBLICATIONS

Halliburton Services brochure, "Grouting Methods and Systems", 15 pp. Duncan, Okla. 73533.

Primary Examiner—Stephen J. Novosad
Attorney, Agent, or Firm—Kenway & Jenney

[57] ABSTRACT

A flooding and grouting valve is provided for use in an offshore jacket. The valve mechanism includes a flood valve portion including an opening to ambient water and a rotatable gate for selectively covering and uncovering the opening. The valve mechanism also includes a check valve mounted on the gate for rotation therewith. The check valve includes a passage which communicates with the interior of the gate, whereby the check valve and gate together form a passage for conducting grout. The check valve is to be connected to a grout supply line such that opening of the check valve is opened by the action of incoming grout. A conduit-type, drive rod is rotatably mounted on the jacket, is connected to the check valve, and serves as a grout conduit. The rod extends to an upper end of the jacket whereby an operator at the water surface may rotate the check valve, and thus the gate, to open or close the flood openings.

24 Claims, 12 Drawing Figures

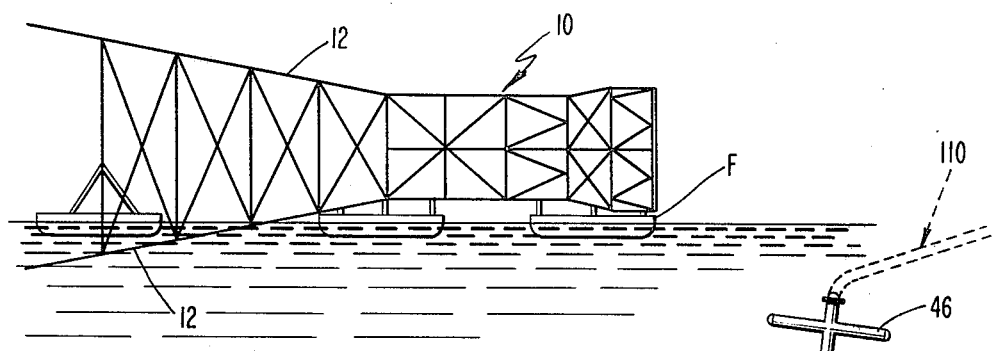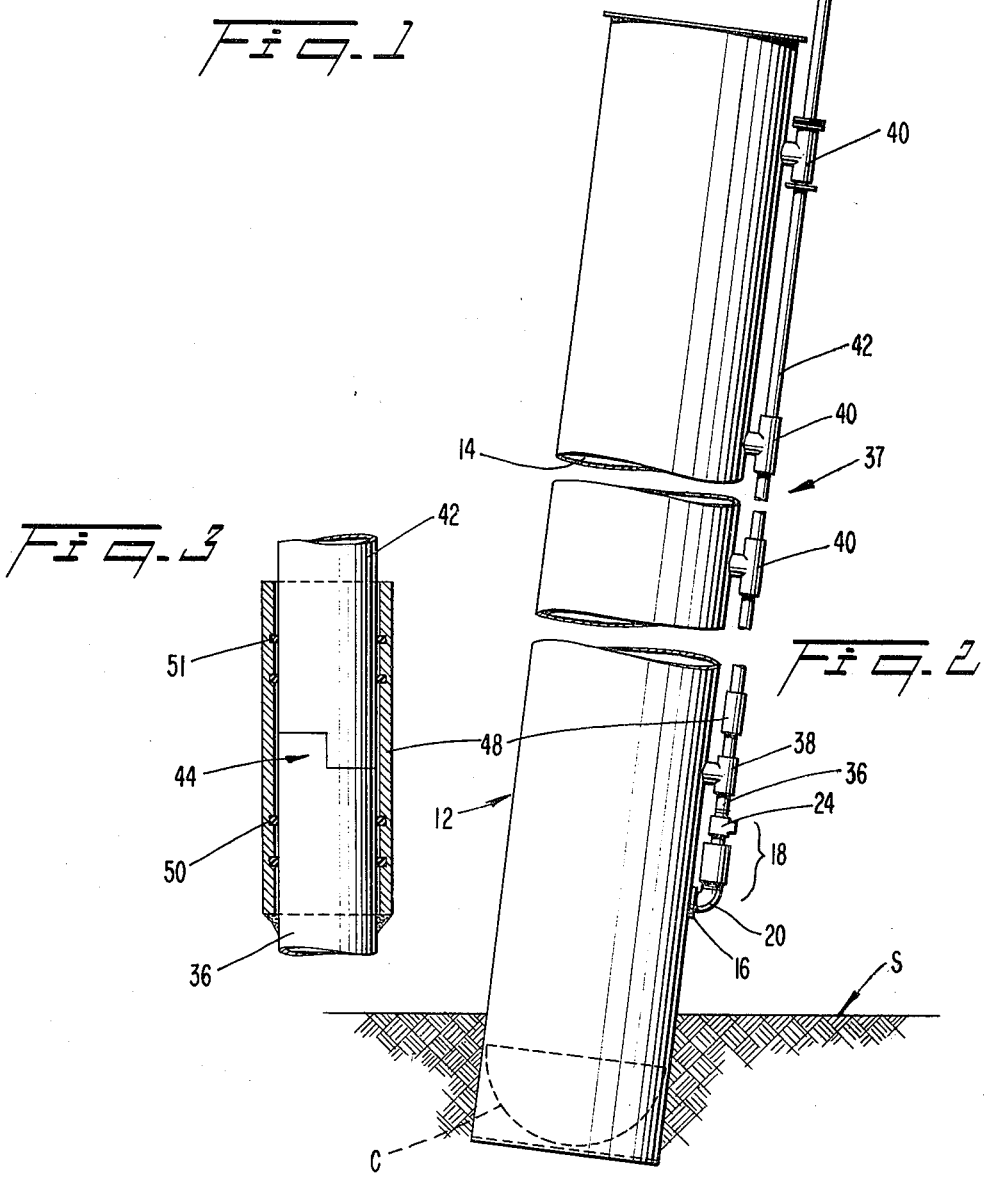

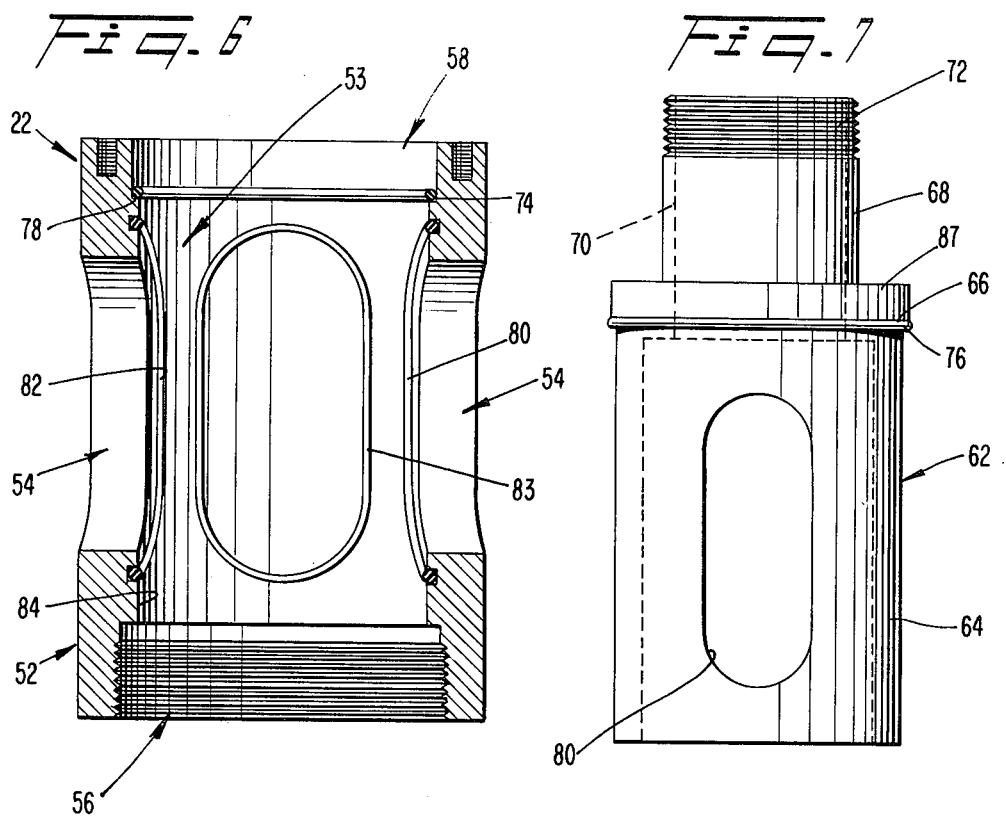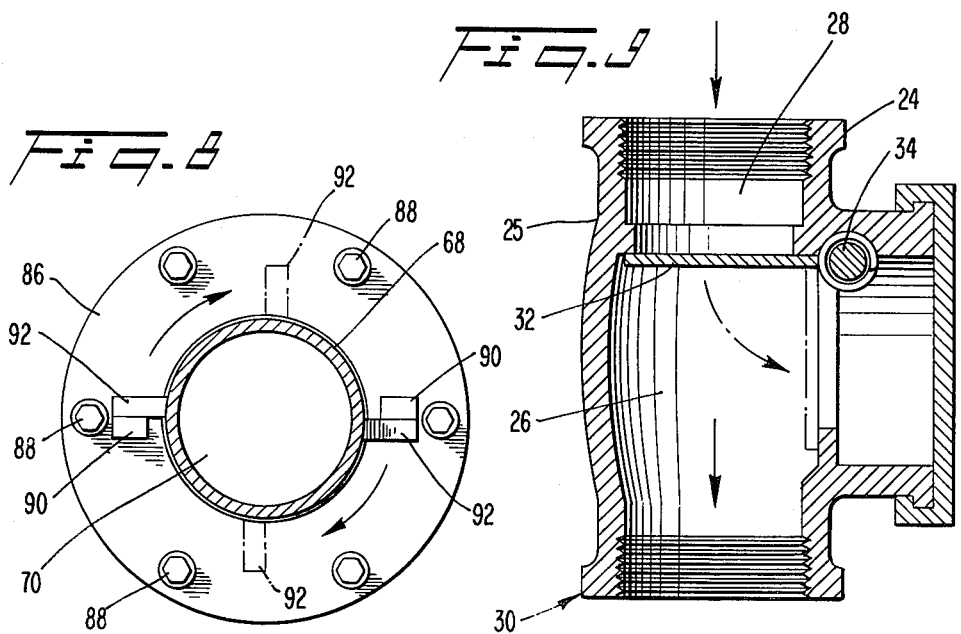

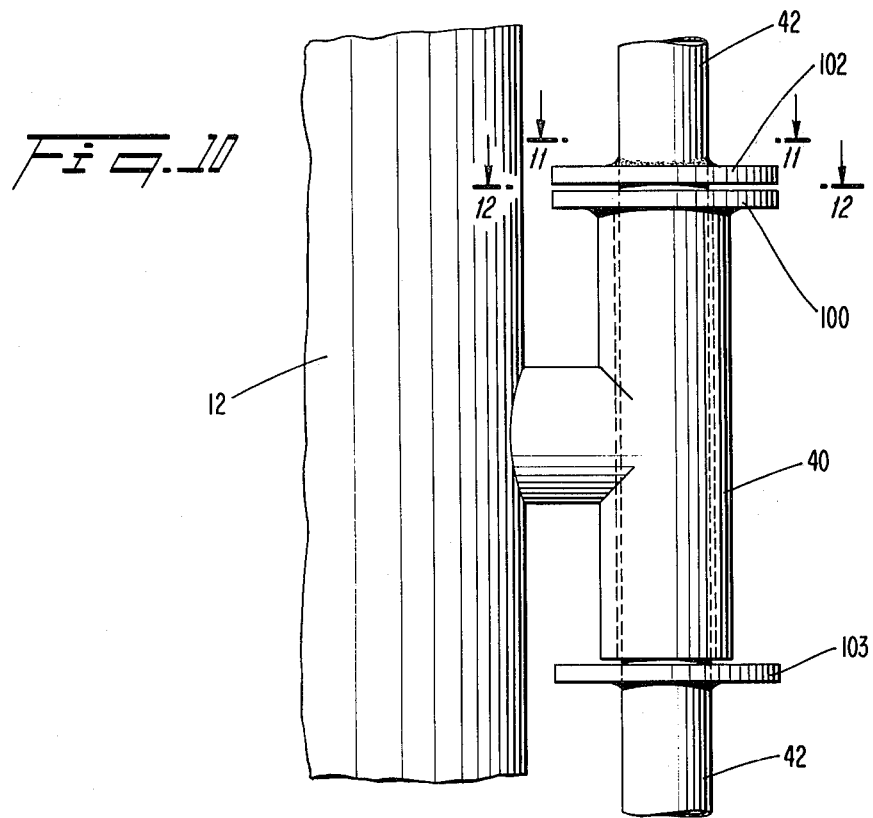
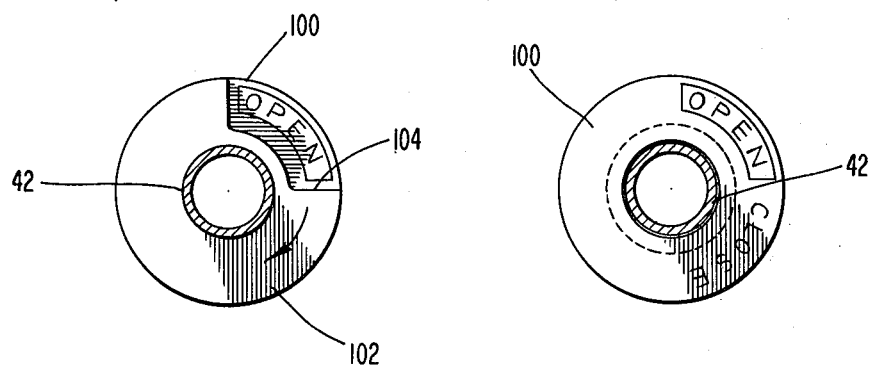

VALVING METHODS AND APPARATUS FOR FLOODING AND GROUTING OFFSHORE JACKET SLEEVES

BACKGROUND AND OBJECTS OF THE INVENTION

The present invention relates to offshore jacket structures such as those for supporting drilling platforms and, in particular, to the flooding and grouting of pile sleeves for such structures during installation thereof on a seabed.

Offshore structures of the type utilized in the drilling of oil or gas wells generally comprise a jacket which is anchored to the seabed and a platform which is supported on the jacket above the water surface. The jacket may comprise a plurality of legs or main sleeves which rest on the seabed and project upwardly beyond the water surface to carry the platform. Pile members are driven through the main sleeves (and/or through skirt sleeves attached to the main sleeves) and into the seabed to pin the jacket to the seabed. Apparatus of this type is disclosed for example in U.S. Pat. No. 3,987,636 issued to Hruska et al on Oct. 26, 1976 and assigned to the assignee of this invention. The disclosure of that patent is incorporated herein by reference as if set forth at length.

Generally, the jacket is initially fabricated at a land-based facility and then towed on its side in a floating condition to an offshore work site. Thereafter, the jacket is turned to an upright position within the water by selectively flooding the lower ends of at least some of the water-engaging sleeves. This can be achieved by manually actuating a valve situated on the wall of the sleeve to communicate the interior of the sleeve with the surrounding water. After the jacket has been turned, other compartments are flooded, whereby the jacket sinks onto the seabed. Thereafter, the flood valves are closed and pile members are driven through the sleeves and into the seabed by suitable pile-driving equipment located at the water surface.

In order to permanently secure the piles in place, grouting is introduced into the annulus formed between the outer face of each pile and its associated leg or skirt sleeve. The grout is pumped downwardly from a source at the water surface, through a grout supply line, the end of which is connected to a grout valve, such as a check valve, at an inlet port in the sleeve wall. The grout supply line is usually connected to the sleeve and extends along the length thereof to the water surface. It will be appreciated that separate grout openings and separate flood valves as well as separate grout lines and flood valve manipulators have heretofore been required in each sleeve for flooding and grouting, adding to the fabricating cost of the jacket as well as to the manipulative efforts required.

It is, therefore, an object of the present invention to minimize or alleviate problems of the type discussed above.

Another object of the present invention is to simplify the equipment and operation required to flood and grout a jacket sleeve.

A further object of the invention is to reduce the number of inlets and valves required for each sleeve for flooding and grouting operations.

An additional object of the invention is to facilitate the manipulation of a subsea valve from the water surface.

Still another object of the invention is to unitize a grout conduit and valve manipulator on a jacket structure.

A further object of the invention is to enable flood water and grout to be introduced into a jacket sleeve through a common opening.

It is another object of the invention to provide a flood and grout valve which includes a housing having flood openings communicating with ambient water, a rotatable gate in the housing for opening and closing the flood openings, and a check valve for grout which is mounted on the gate and conducts grout to the interior of the gate.

SUMMARY OF THE INVENTION

These objects are achieved by a flooding and grouting valve mechanism for use in an offshore jacket of the type which is to be floated to an offshore work site, submerged onto a seabed by flooding of at least some sleeves of the jacket, and then anchored to the seabed by piles driven through the sleeves and grouted thereto. The flooding and grouting valve mechanism is attached to a sleeve and includes a flood opening for admitting ambient sea water, a grout opening for admitting grout, and an outlet communicating with an inlet of the sleeve. The valve mechanism further includes a valve arrangement for uncovering the flood and grout openings to selectively admit sea water or grout to the sleeve.

Preferably, the valve means comprises a housing with a flood opening, a rotatable gate for opening and closing the flood openings, and a check valve mounted on the gate for conducting grout to the interior of the gate, with the flood valve manipulator functioning as a grout line.

BRIEF DESCRIPTION OF THE DRAWINGS

The advantages of the present invention will become apparent from the following detailed description of a preferred embodiment thereof in connection with the accompanying drawings in which like numerals designate like elements and in which:

FIG. 1 is a schematic side elevational view depicting an offshore jacket in a floating condition;

FIG. 2 is a side elevational view of a jacket sleeve containing a flooding and grouting valve according to the present invention;

FIG. 3 is a fragmentary longitudinal sectional view of a drive rod arrangement for actuating the valve mechanism, depicting a drive joint between portions of the rod arrangement;

FIG. 6 is a longitudinal sectional view of a housing component of the flood valve;

FIG. 7 is a side elevational view of the gate component of the flood valve;

FIG. 8 is a cross-sectional view taken along line 8—8 of FIG. 4;

FIG. 9 is a longitudinal sectional view through a grout valve portion of the valve mechanism depicting a spring-biased valve element thereof in a closed position (solid lines) and an open position (broken lines);

FIG. 10 is a side elevational view of an upper portion of the drive rod grout conduit mechanism;

FIG. 11 is a cross-sectional view taken along line 11—11 of FIG. 10; and

FIG. 12 is a cross-sectional view taken along line 12—12 of FIG. 10.

DETAILED DESCRIPTION OF A PREFERRED EMBODIMENT OF THE INVENTION

Figures 4, 5:
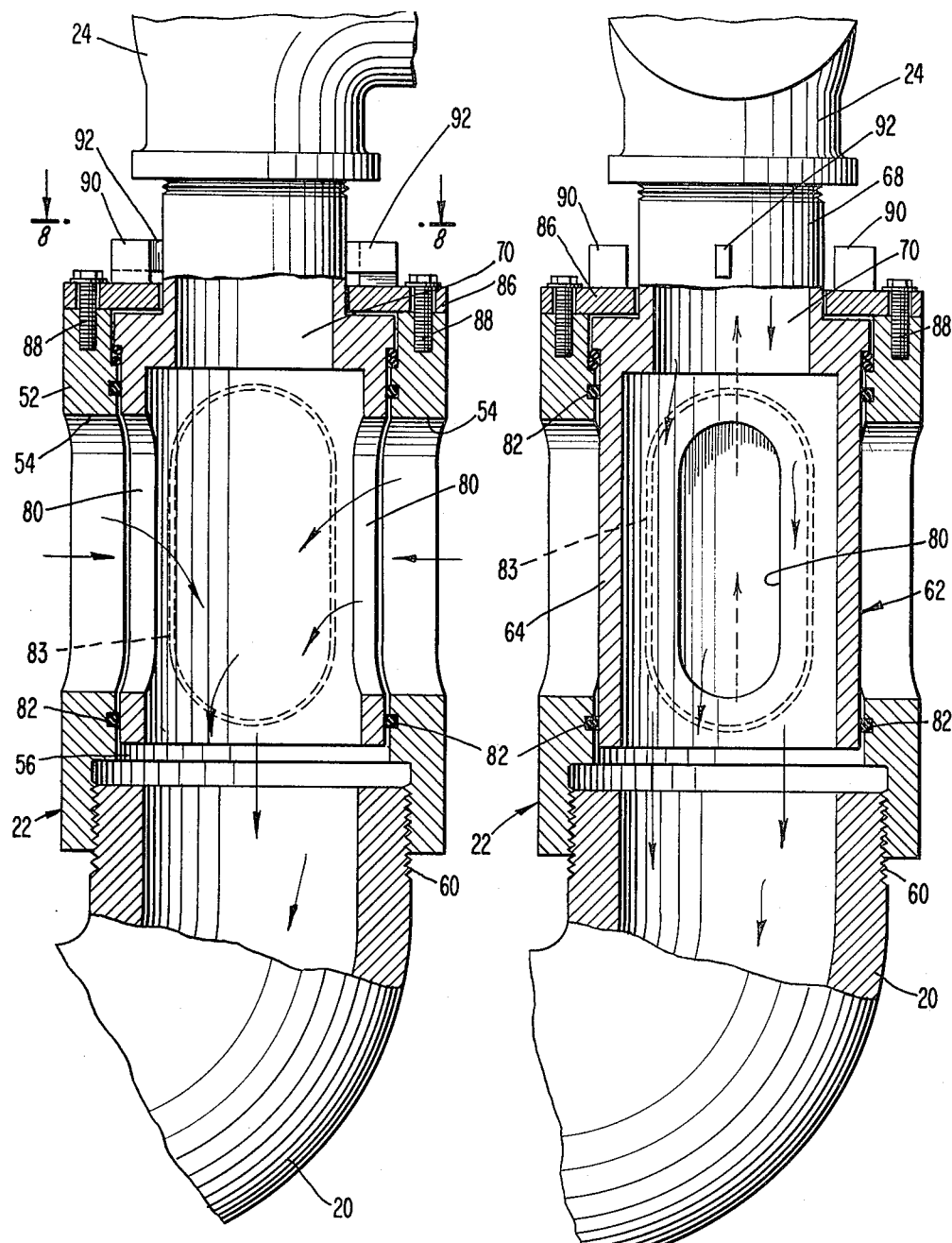
FIG. 4 is a longitudinal sectional view taken along a flood valve portion of the valve mechanism, depicting a gate of the flood valve in an open condition.
FIG. 5 is a view similar to FIG. 4 depicting the gate in a closed position.

An offshore jacket 10 is depicted in FIG. 1 as being floated to an offshore work site. At the site, the jacket is turned to an upright posture within the water and then lowered onto the seabed. This is achieved by flooding the compartments 14 located at lower ends of the jacket legs or sleeves 12. Thereafter, piles are driven through the legs and into the seabed, whereupon grout is introduced into the compartments to fill the annulus formed between each pile and its associated leg. Reference may be had to the aforementioned U.S. Pat. No. 3,987,636 to Hruska for more details regarding that sequence of operations.

In accordance with the present invention, the flooding and grouting of the compartment 14 of each sleeve is effected through a common inlet port 16 in the sleeve and controlled by a common valve mechanism 18.

The inlet port 16 includes a J-shaped elbow fitting 20 which is rigidly attached at a fluid outlet end thereof to the jacket sleeve 12, and has a fluid inlet end thereof facing toward the upper end of the sleeve.

Screw-fitted onto the inlet end of the fitting 20 is a first portion 22 of the valve mechanism which is in the form of a gate valve and will be described below in more detail. Mounted on the gate valve 22 is a second valve portion 24 which comprises a check valve. Through a casing 25 of the check valve 24 there extends a fluid passage 26 (FIG. 9) having an entrance 28 to which a grout conduit may be connected, and a discharge end 30 communicating with the gate valve. Disposed within the fluid passage 26 of the check valve is a valve element 32 which is spring-biased by a torsion spring 34 to a closed position closing off the entrance 28 (see broken line position of the valve element 32 in FIG. 9).

Threadedly attached to the casing 25 of the check valve 24 is a connector rod 36 portion of a grout conduit comprising a drive rod assembly 37. The conduit-type rod 36 extends a small portion of the distance toward the upper or opposite end of the sleeve 12. The rod 36 is rotatably supported by a hollow collar 38 which is fixedly mounted to the outer surface of the jacket sleeve 12.

Additional collars 40 are mounted on the sleeve 12 in alignment with the first collar 38 and are adapted to receive a conduit-type rod portion 42 of the drive rod assembly 37. The drive rod 42 has an axially separable coupling section 44 at a lower end thereof (FIG. 3) and a manual turning handle 46 at the other end. The coupling section 44 comprises a semicylindrical recess and projection which are adapted to mate with a semicylindrical projection and recess of the connector rod 36 to establish a rotary drive coupling between the rods 36, 42 when the drive rod 42 is slid through the collars 40 into engagement with the connector rod 36. Accordingly, when the drive rod 42 is rotated, the housing 25 of the check valve 24 is concurrently rotated. A sleeve 48 surrounds the coupling section 44 is welded to rod means 36, and includes seal rings 50. These seal rings, in combination with seal rings 51 carried by sleeve 48 and engaging rod means 42, provide a sealed but separable grout conduit coupling.

The gate valve 22 (FIG. 4–7) comprises a cylindrical housing 52 having an inner chamber 53, a pair of aligned and diagonally opposed side openings 54 at opposite sides, and upper and lower end openings 58, 56. The lower end opening 56 is defined by internal threading, which threading is connected to external threading 60 on the fitting 20 to communicate the end opening with the fitting.

Disposed within the housing 52 for rotation about the vertical longitudinal axis of the housing is a valve gate 62 (FIG. 7). The gate 62 comprises a hollow cylindrical skirt portion 64, and a stem portion 68. The stem 68 is hollow to define a channel 70 therethrough (FIG. 4) and includes external threading 72. The external threading is connectible to internal threading in the passage 26 of the check valve 24 to communicate the passage 26 with the channel 70.

A shoulder portion 66 of the gate 62 extends radially outwardly beyond the skirt portion 64 to define an annular surface which overlies a corresponding annular shoulder 74 on the housing 62 (FIG. 6). Rings 76, 78 of anti-friction material such as Teflon ® are mounted adjacent shoulders 66 and 74 and function to support the gate 62 for rotation within the housing 52, as well as to provide a fluid seal between the gate and the housing.

The skirt portion 62 of the gate includes a pair of aligned, diagonally opposed ports 80 which are alignable with the side openings 54 of the housing when the gate is rotated to an open or "flood" position (FIG. 4). In that position, ambient water is able to pass through the side openings 54, the ports 80, the lower end opening 56, the fitting 20 and into the leg compartment 14 to flood the latter when the jacket is in a floating condition (FIG. 1).

Encircling each associated side opening 54 is a resilient O-ring seal 82. Each O-ring 82 is mounted within a groove formed in an inside wall 84 of the housing and is operable to create a fluid seal between the aligned ports and side openings when the gate 62 is in a flood position. An additional pair of O-rings 83 (one shown in FIG. 6) are mounted on the wall 84 between the openings 54 so as to encircle the ports 80 when the valve is in a closed position (FIG. 5).

Mounted at an upper end of the housing 52 is a ring plate 86 (FIG. 4). The ring plate 86 includes a central aperture through which the stem 68 projects. Screws 88 connect the ring plate to the housing whereby the latter overlies an end wall 87 of the gate to retain the gate within the housing.

Mounted on an outer surface of the end plate 86 are a pair of longitudinally extending lugs 90 (FIG. 8) which are spaced 180 degrees apart. Projecting radially outwardly from the stem portion 68 of the gate 62 are a pair of radial lugs 92. The radial lugs 92 rotate with the gate and abut against the longitudinal lugs, which form stop members to prevent overtravel of the valve gate beyond the flood position.

Mounted on the uppermost collar 40 is a first ring element 100 (FIG. 12) which contains the legends "open" and "closed". A cooperating second ring element 102 (FIG. 11) is mounted on the drive rod 42 in overlying relation to the first ring element 100. The second ring element 102 contains a notch 104 which exposes the "open" legend when the valve is in the open or flood position, and exposes the "closed" legend when the valve is in a closed position. In this fashion, an operator manipulating the drive handle 46 can readily perceive the condition of the valve mechanism.

Ring elements 102 and 103 cooperate with fitting means 40 to "lock" coupling means 44 in a unified condition, until the fitting 40 is cut from sleeve 12, as hereinafter described.

It will be appreciated from the foregoing that the entrance 28 of the check valve 24 is normally closed by the spring-biased valve element 32 (solid line position of FIG. 9). When the valve gate 62 is in a closed non-flood position (FIG. 5), the non-apertured portion of the gate skirt 64 blocks entry of water from the side openings 54 in the housing 52. However, the grouter 37 is operable, in this valve position, to transmit grout through valve 22 to jacket sleeve communicably fitting 20. By rotating the gate 90 degrees from the closed position to the open position (FIG. 4), the ports 80 and side openings 54 become aligned, enabling water to flow through the fitting 20 and into the leg compartment 14 to flood same.

IN OPERATION, the jacket 10 is floated on floats F to the offshore work site, with the valve gate 62 in a closed position to maintain the sleeve compartments buoyant. At the work site the valve gates of lower ones of the sleeves are manually rotated to an open position by an operator located adjacent either the valve 18 or the control handle 46. Overtravel of the gate is prevented by engagement of the lugs 90, 92. Water thus travels through the openings 54, the port 80, into the interior of the gate 62, and then through the outlet 56, the fitting 20 and into the respective compartments 14. As the jacket gradually sinks, other sleeves enter the water and their valve gates are also opened in similar manner. This process is continued so that the jacket turns upright and eventually sinks onto the seabed S. Thereafter, piles (not shown) are driven through the sleeves and into the seabed, puncturing closures C (FIG. 2) which had functioned to close-off lower ends of the compartments.

The control handles 46 is rotated to close the valve gates. A grout supply conduit 110 is attached to the upper end of rod/conduit means 37, as shown in FIG. 2, and grout is pumped through the conduit means 37 and valves 24 and 22 into the interior of jacket sleeve 12, by way of fitting 20. The incoming grout forces the valve element 32 open, enabling grout to enter the entrance 28 and pass through the passage 26, the interior 70 of the gate stem 68, the interior of the gate skirt 64, and then through the outlet opening 56 and the fitting 20, and into the compartment 14 to fill an annulus formed between the pile and the sleeve.

It will be appreciated that the valve 24 may take various forms, with the element 32 being biased to a closed position, or may comprise a rupturable means actually secured in a closed position in a manner whereby the incoming grout can rupture the element. If desired, the housing 52 and the fitting 20 can be of integral construction rather than separate members. Valve mechanisms according to the present invention can be mounted on main sleeves of the jacket, i.e., those forming the primary support legs, as well as on secondary skirt sleeves to enable the latter to be flooded and grouted if desired.

SUMMARY OF MAJOR ADVANTAGES AND SCOPE OF THE INVENTION

In accordance with the present invention, flood water and grout can be introduced into a sleeve compartment through a common inlet in the sleeve, thereby eliminating the need for separate openings and valve mechanisms. The valve mechanism can be actuated romotely by means of the drive rod/conduit which is mounted to the sleeve and is thereby unaffected by wave action. The valve mechanism is relatively uncomplicated in structure. The gate which opens and closes the flood openings has a hollow stem which carries the check valve and also forms a passage for conducting grout to the interior of the gate skirt. The gate can be turned to initiate a flooding step without affecting the condition of the check valve which simply turns with the gate. Thereafter, the gate valve manipulating rod will function as a grout line, eliminating the need for a separate grout line and grout line mounting means.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A flooding and grouting valve mechanism for use in an offshore jacket of the type which is to be floated to an offshore work site, submerged onto a seabed by flooding of at least some sleeves of the jacket, and then anchored to the seabed by piles driven through the sleeves and grouted thereto, said flooding and grouting valve mechanism being attached to a sleeve and including:

means defining a flood opening for admitting ambient sea water, means defining a grout opening for admitting grout, means defining a grout conduit coupled to said grout opening, an outlet communicating with an inlet of the sleeve, which inlet communicates with a compartment within the sleeve to conduct thereto sea water or grout, and valve means for uncovering said flood and grout openings to selectively admit sea water or grout for delivery to said compartment, said grout conduit means including a portion forming said valve means for uncovering said flood openings.

2. A flooding and grouting valve mechanism according to claim 1, wherein said valve means comprises a rotatably mounted gate for selectively covering and uncovering said flood opening, and grout flow control means for uncovering said grout opening in response to the action of incoming grout.

3. A flooding and grouting valve mechanism according to claim 2, wherein said grout flow control means is mounted on said gate for rotation therewith and wherein said mechanism includes valve manipulating means operable to manipulate said valve means and conduct grout thereto.

4. A flooding and grouting valve mechanism according to claim 1, wherein said valve means comprises a gate rotatably mounted for selectively covering and uncovering said flood opening, and a valve mounted on said gate and carrying said grout opening, said gate being hollow to define a passage for grout received through said grout opening.

5. Apparatus according to claim 1, wherein said valve means comprises a generally cylindrical housing defining an inner chamber, said flood opening being formed in said housing, said housing being open at a first longitudinal end thereof to define said outlet; said gate including a generally cylindrical skirt portion mounted for rotation in said chamber about the longitudinal axis of said housing, said skirt including a port which is alignable with said flood opening in one position of said gate and non-aligned therewith in another position of said gate, and a stem portion extending through a second longitudinal end of said housing, said stem portion being hollow to communicate said grout opening with said outlet.

6. Apparatus according to claim 5, wherein said gate includes a radial shoulder portion engaging a corresponding radial shoulder portion of said housing to rotatably support said gate on said housing.

7. Apparatus according to claim 5, including seal means surrounding said flood opening of said housing and disposed intermediate said housing said skirt portion of said gate in water-sealing contact with said skirt portion when said flood opening and said port are not aligned.

8. Apparatus according to claim 5, wherein said inlet on said sleeve comprises a fitting, said housing of said valve means being mounted on said fitting.

9. Apparatus according to claim 5, including grout-flow control means comprising a check valve mounted on said stem and defining said grout opening.

10. Apparatus according to claim 9, including valve actuating means connected to said check valve for imparting rotation to said gate and defining grout conduit means.

11. Apparatus according to claim 10, wherein said valve actuating means comprises rod-like conduit means extending to an upper end of said jacket.

12. Apparatus according to claim 11, including a plurality of collars mounted on said jacket, said rod means extending through said collars to a position above said water surface.

13. Apparatus according to claim 12, wherein said rod means comprises a first conduit section coupled to said check valve and a second conduit section detachably connected to said first rod section and extending to the upper end of said jacket.

14. Apparatus according to claim 12, including means on said drive rod means adjacent the water surface for indicating the condition in which said flooding and grouting valve is disposed.

15. Apparatus according to claim 5, including stop means on said housing for engaging means on said gate to prevent rotation of said gate beyond a flood position of said valve.

16. A flooding and grouting valve mechanism for use on an offshore jacket of the type comprising a plurality of sleeves, each sleeve comprising an anchoring end for resting on a seabed, said sleeves including an inner compartment located adjacent said anchoring end which compartment is flooded during installation of the jacket on the seabed, said sleeves each being sized to receive therethrough a pile to be driven into the seabed and grouted in place, said valve mechanism connected to an inlet in at least some of said sleeves to communicate the valve mechanisms with the respective compartments, said valve mechanism comprising:
a housing including an inner chamber, a first opening for communicating said inner chamber with the ambient environment and a second opening communicating said inner chamber with a compartment inlet of an associated jacket sleeve, a gate rotatably mounted to said inner chamber, said gate being rotatable between:
  a valve open position for intercommunicating said first and second openings to admit ambient water into the compartment to flood the latter, and
  a valve closed position for blocking intercommunication between said first and second openings, and
a check valve mounted on said gate for rotation therewith, said check valve comprising a passage communicating with said second opening through said chamber, said passage having an entrance adapted to receive grout, and a normally closed valve element at said entrance which is opened by the action of inflowing grout.

17. Apparatus according to claim 16, wherein said gate comprises a hollow skirt and a hollow stem projecting upwardly from said skirt, said check valve being mounted on said stem with said passage communicating with the interior of said skirt through said stem.

18. Apparatus according to claim 17, wherein said skirt includes a side opening which is communicable with said first opening in the valve housing when the gate is in an open position.

19. Apparatus according to claim 16, including grout conduit means defining manually actuable drive rod means mounted to said sleeve and connected at one end to said check valve and extending therefrom to an opposite end of said sleeve, to enable said valve gate to be rotated from said opposite end.

20. Apparatus according to claim 16, wherein said sleeve inlet comprises a fitting, said valve housing being threadedly connected to said fitting.

21. Apparatus according to claim 16, including interengageable stop means on said housing and gate to prevent rotation of said gate beyond a valve open position.

22. Apparatus according to claim 16, wherein said gate includes an annular radial shoulder which rests upon an annular radial shoulder on said housing.

23. An offshore jacket comprising:
a plurality of sleeves, each sleeve comprising an anchoring end for resting on a seabed, and a platform support end for supporting a platform above a water surface,
  said sleeves including inner compartments located adjacent said anchoring end, which compartments are to be buoyant during transport of the jacket to an offshore work site and which are to be flooded during installation of the jacket on the seabed,
  said sleeves being hollow for the insertion therethrough of piles which are to be driven into the seabed and grouted within the sleeves, and
flooding and grouting valve mechanisms mounted to inlets of said compartments, said valve mechanisms each comprising:
a generally cylindrical housing forming and inner chamber and having:
  a pair of diametrically opposed flood openings communicating with said chamber,
  an outlet opening communicating with said chamber and defined by an open longitudinal end of said housing, and
  a radial shoulder located at an end of said housing opposite said outlet opening;
an end plate mounted at an end of said housing opposite said outlet opening, said end plate including a central aperture and a plurality of first lugs, a rotary gate comprising:

a hollow generally cylindrical skirt portion disposed within said chamber, said skirt portion including a pair of diagonally opposed ports, a radial shoulder portion at one end of said skirt portion and resting upon said radial shoulder of said housing to support said gate for rotation within said chamber about a longitudinal axis of said housing, a hollow stem portion projecting longitudinally from said shoulder portion and extending through said central aperture of said end plate, said stem portion forming a grout channel communicating with said chamber, and a plurality of second lugs extending from said stem portion for engagement with said longitudinal lugs when said valve is in an open position communicating with said flood openings with said outlet opening, and a pair of seal rings disposed around said flood openings which sealingly bear against said skirt portion, a check valve comprising:

a casing forming a passage therethrough, an exit end of said passage being connected with said stem, and a valve element normally closing an entrance end of said passage, a first rod comprising grout conduit means mounted on said casing of said check valve, a second rod comprising additional grout conduit means releasably connectible to said first rod and extending to said platform support end of said sleeve, said second rod including a manual control handle for being rotated:

in a valve opening direction until stopped by interengagement of said first and second lugs whereby said gate communicates said flood openings with said ports to enable ambient water to flow through said outlet opening of said valve and into said compartment, and in an oppositely directed valve closing direction by ninety degrees whereby said ports are misaligned relative to said flood openings, allowing grout to be introduced into said check valve and conducted through said grout channel of said stem portion.

24. A method for installing an offshore jacket onto a seabed comprising the steps of:

floating the jacket to a work site while maintaining compartments within sleeves of said jacket in a bouyant state, using valve actuating, conduit-defining rod means to actuate a valve mechanism on one of said sleeves of said jacket to communicate a flood opening on said valve mechanism with a flood/grout inlet of a said sleeve to admit ambient sea water through said flood/grout inlet to flood a said compartment, causing said jacket to tend to be lowered onto the seabed, actuating said valve mechanism to block communication between said flood opening and said flood/grout inlet, driving anchor piles through said sleeves, supplying grout through said conduit defining rod means to a normally closed grout opening carried by said valve mechanism and, pumping said grout through said conduit defining rod means whereby said grout forces open said grout opening and travels through said flood/grout inlet.

* * * * *

Notice of Adverse Decision in Interference

In Interference No. 100,919, involving Patent No. 4,240,767, B. E. Gracia, VALVING METHODS AND APPARATUS FOR FLOODING AND GROUTING OFFSHORE JACKET SLEEVES, final judgment adverse to the patentee was rendered Jan. 27, 1983, as to claims 1, 4 and 24.
[*Official Gazette June 14, 1983.*]